Patented Nov. 30, 1948

2,454,835

UNITED STATES PATENT OFFICE 2,454,835

N-PROPYL DIAMINODIPHENYLSULFONE AND PROCESS FOR OBTAINING SAME

Albert L. Rawlins, Grosse Pointe Woods, Mich., assignor to Parke, Davis & Company, Detroit, Mich., a corporation of Michigan No Drawing. Application March 29, 1943, Serial No. 481,007

3 Claims. (Cl. 260—397.6)

The invention has to do with new aryl amines of the diamino diphenyl sulfone type. It relates more particularly to p,p'-diamino diphenyl sulfones having a free para amino group attached to one of the phenyl nuclei and a secondary para amino group attached to the other phenyl nucleus.

The new compounds have the general formula

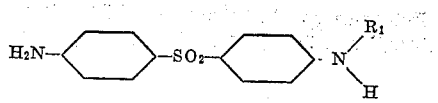

where $R_1$ is alkyl having more than two carbon atoms.

The new compounds are valuable therapeutic agents and intermediates for therapeutic agents. They are generally effective against diseases and infections caused by micro-organisms such as streptococci, staphylococci, pneumococci and mycobacterium tuberculosis. Many of them are effective as antiseptics upon oral administration. They are of low toxicity and are very stable chemically.

A preferred group of compounds of the invention is that of the above general formula, where $R_1$ is a lower straight or branched chain alkyl radical containing not more than six carbon atoms. Compounds of this preferred type, such as p-amino-p'-n-propylamino diphenyl sulfone, are especially valuable for treatment of patients affected by tuberculosis.

The compounds of the invention can be made by starting with p,p'-diamino diphenyl sulfone and alkylating one of the two amino groups of this sulfone, using an alkyl halide or suitably substituted alkyl halide. The alkylation can be partial, whereby secondary amines are obtained. This transformation can be illustrated as follows:

$$H_2N-C_6H_4-SO_2-C_6H_4-N\begin{array}{c}H\\ \\H\end{array} + R_1-Hal \text{ (Hal is halogen)} \rightarrow$$

$$H-Hal + H_2N-C_6H_4-SO_2-C_6H_4-N\begin{array}{c}R_1\\ \\H\end{array}$$

Instead of starting with p,p'-diamino diphenyl sulfone, one can use a para-halogen-p'-monoamino diphenyl sulfone and react it with a primary alkyl amine to replace the halogen of the sulfone by an alkyl amino group.

The invention can be illustrated by the following examples:

Example 1.—p-Amino-p'-n-propylamino diphenyl sulfone $$H_2N-\bigcirc-SO_2-\bigcirc-\underset{H}{N}-CH_2CH_2CH_3$$

41 grams of diaminodiphenyl sulfone, 125 grams of n-propyl bromide, 165 cc. of water and 82 cc. of alcohol are mixed and refluxed for 24 hours. The crystals which form on cooling are filtered off, dissolved in absolute alcohol and the alcoholic solution decolorized by treatment with charcoal. The product is crystallized out of the absolute alcohol solution, separated and dried. It consists of white crystals of p-amino-p'-n-propylamino diphenyl sulfone which melt at 201–203° C. Analysis gives, nitrogen found, 9.82%, nitrogen calculated, 9.65%.

The product of this example is an effective antiseptic against Myco. tuberculosis and like micro-organisms.

Instead of using n-propyl bromide in this example, ethyl bromide or methyl bromide can be used, with suitable variation of the procedure such as use of a pressure reaction vessel. With these reactants the products are, respectively, p-amino-p'-ethylamino diphenyl sulfone and p-amino-p'-methylamino diphenyl sulfone.

Example 2.—p-Amino-p'-n-amylamino diphenyl sulfone $$H_2N-\bigcirc-SO_2-\bigcirc-\underset{H}{N}-C_5H_{11}$$

90 grams of 4,4'-diamino diphenyl sulfone, 200 grams of n-amyl bromide, 200 cc. of alcohol and 400 cc. of water are mixed and refluxed for 26 hours. The mixture is diluted with an equal volume of water and neutralized with concentrated NaOH solution. The crystals formed are filtered off and crystallized from alcohol, benzene and, finally, from a 50–50 mixture of water and alcohol containing 2% hydrochloric acid. The pearly-white crystals formed melt at 116–118° and are shown to be the monoamyl derivative by analysis. Analysis gives, nitrogen found, 8.80%, nitrogen calculated, 8.85%.

Example 3.—p-Amino-p'-dodecylamino diphenyl sulfone

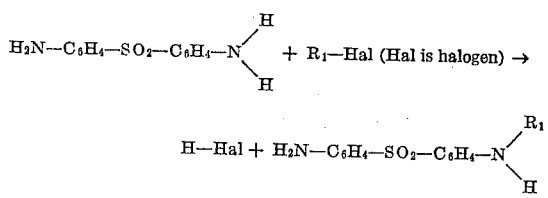

200 grams of 4,4'-diamino diphenyl sulfone, 290 grams of dodecyl iodide, 800 cc. of alcohol and 200 cc. of water are refluxed for 15 hours. The crystals which form on cooling are recrystallized from alcohol and then acetone. 50 grams of white pearly-like crystals melting at 172-173° C. are obtained. Analyses show it to be the monododecyl derivative.

*Example 4.—p-Amino-p'-octadecylamino diphenyl sulfone*

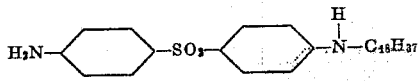

185 grams of 4,4'-diamino diphenyl sulfone, 300 grams of n-octadecyl iodide and 900 cc. of alcohol are mixed together and the mixture refluxed for 22 hours. The mixture is then cooled and the crystals which form are filtered off. The product is thereafter crystallized from acetone and then from benzene and filtered off and washed with ether. 35 grams of white, pearly-like crystals are obtained melting at 166-168°. Analyses show it to be the mono-octadecyl derivative.

The above examples are merely illustrative of the means by which the new compositions of this invention may be obtained. When used in the clinic, the dosages orally and by injection are comparable to those used with other known diphenyl sulfone compounds. For instance, the n-propylamino product of Example 2 can be given orally to human subjects in dosages of 0.8 gram to 1.2 grams per day.

What I claim as my invention is:

1. A compound of the formula.

2. Process for obtaining p-amino-p'-n-propylamino diphenyl sulfone which comprises reacting p,p'-diamino diphenyl sulfone with an excess of n-propyl halide.

3. Process for obtaining p-amino-p'-n-propylamino diphenyl sulfone which comprises reacting p,p'-diamino diphenyl sulfone with an excess of n-propyl bromide.

ALBERT L. RAWLINS.

REFERENCES CITED

The following references are of record in the file of this patent:

UNITED STATES PATENTS

| Number | Name | Date |
|---|---|---|
| 2,224,156 | Kharasch | Dec. 10, 1940 |
| 2,254,872 | Kharasch | Sept. 2, 1941 |
| 2,328,548 | Dohrn et al. | Sept. 7, 1943 |
| 2,333,552 | Pohls et al. | Nov. 2, 1943 |
| 2,382,924 | Tschesche | Aug. 14, 1945 |

FOREIGN PATENTS

| Number | Country | Date |
|---|---|---|
| 490,364 | Great Britain | Aug. 9, 1938 |
| 844,220 | France | July 20, 1939 |

OTHER REFERENCES

Feldman et al., "Proc. Staff Meetings of Mayo Clinic," vol. 20, May 30, 1945, pp. 161 to 165.